Aug. 16, 1932.     R. C. DARNELL     1,872,252
SPARK ADVANCE CONTROL
Filed May 2, 1928     2 Sheets-Sheet 2
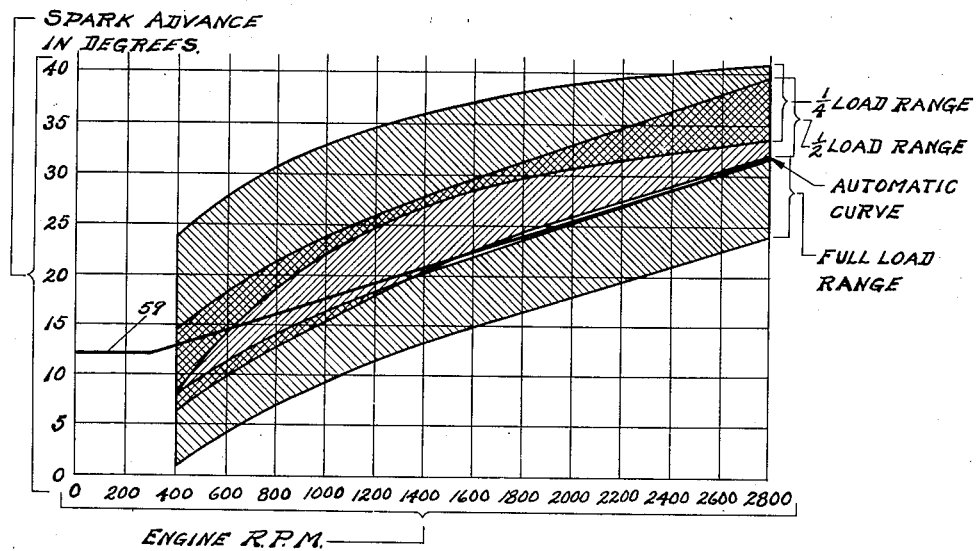
Fig. III.
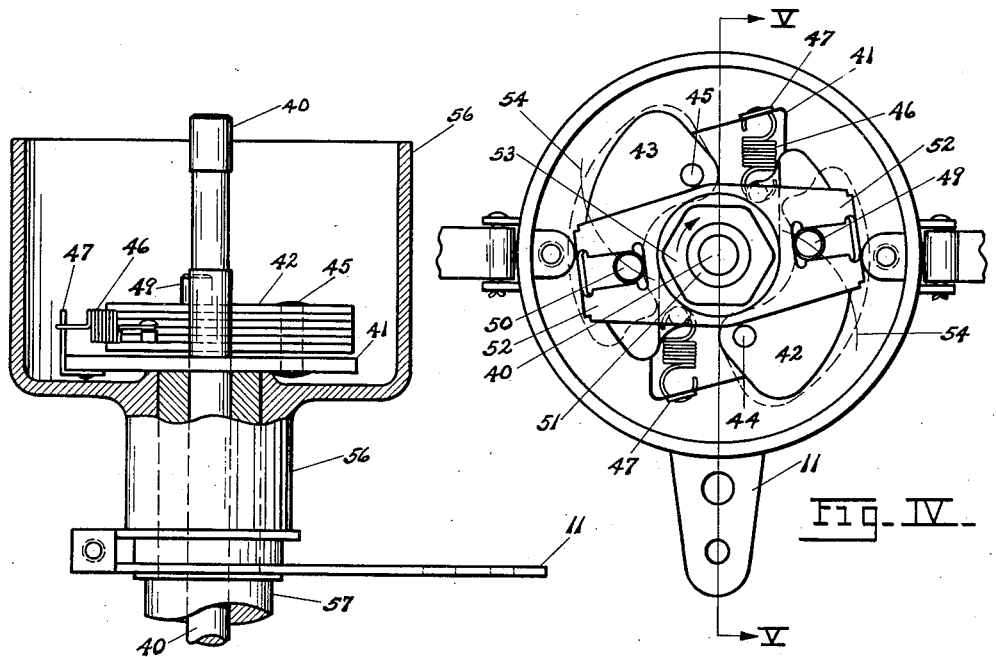
Fig. IV.
Fig. V.
INVENTOR.
REX C. DARNELL
BY
Warren T. Hunt
ATTORNEY.

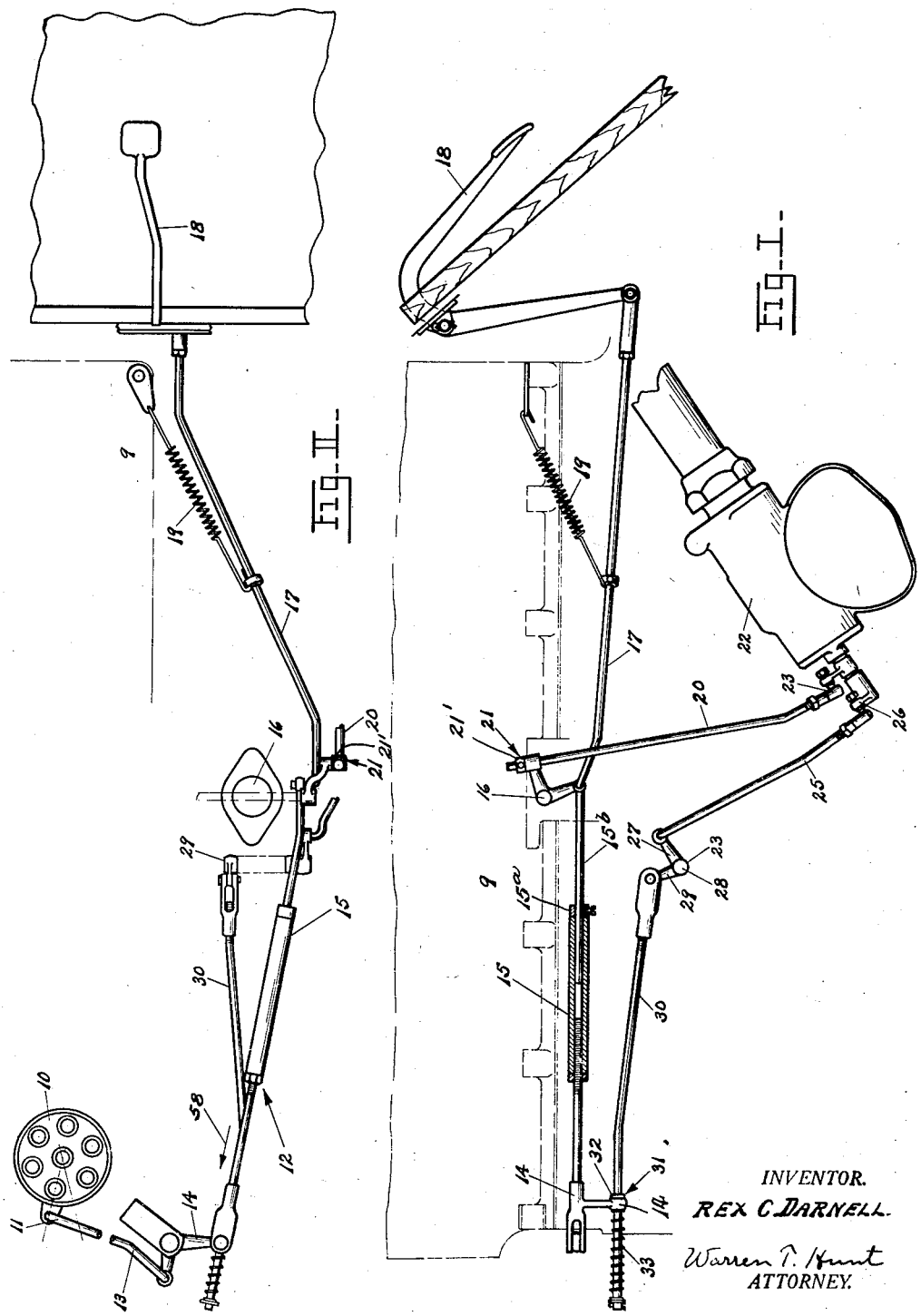

Patented Aug. 16, 1932

1,872,252

UNITED STATES PATENT OFFICE

REX C. DARNELL, OF TOLEDO, OHIO, ASSIGNOR TO THE WILLYS-OVERLAND COMPANY, OF TOLEDO, OHIO, A CORPORATION OF OHIO

SPARK ADVANCE CONTROL

Application filed May 2, 1928. Serial No. 274,433.

My invention relates to internal combustion engines and it has particular relation to the ignition system thereof.

One object of the invention is to provide an ignition control system which will improve the operating characteristics of the engine throughout its speed range.

Another object of the invention is to provide an ignition control of greater flexibility than controls employed heretofore, by interconnecting the accelerator with the advance lever of the spark timer.

It is a further object of the invention to provide a spark control system for internal combustion engines wherein the accelerator is employed to produce the desired variation in the spark advancement.

Another object of the invention is to provide a foot operated spark control.

These together with other objects of the invention will become more apparent from a consideration of the drawings and description hereinafter set forth.

It is common practice to incorporate in the timer of an igniton system of internal combustion engines, a governor type spark control. This mechanism functions in a manner typical of all centrifugal governors and is connected to advance the spark with the speed of the engine. Obviously the control afforded by such a device is a direct function of the speed.

It has been found, however, that the optimum degree of spark advancement is not a function of the engine speed alone but is a function of both engine speed and load. Thus, for example, at full load the advance necessary for the best operating condition is generally less than the advance for the same speed at quarter load. In view of these variations it is apparent that the ordinary governor spark control will not fulfill the conditions since its movement is a function of the speed alone.

According to the present invention I have provided a spark control which is in part operated from the accelerator and is capable therefore of introducing a variable which is a function of the load. While satisfactory results may be obtained by employing this type of control singly, advantageous results have been obtained by combining the two functions whereby the spark setting is a resultant function of both the position of the throttle and the speed of the engine. A better understanding of the principles of my invention may be had by referring to the drawings which illustrate a preferred embodiment.

Figure I is an elevational view of a linkage arrangement interconnecting the accelerator pedal and hand spark and throttle controls employed in practicing my invention.

Fig. II is a plan view of the structure illustated in Fig. I.

Fig. III is a chart illustrating the relation of the spark advance to the engine speed at various loads for optimum working condition.

Fig. IV is a plan view of a timer governor mechanism for controlling the spark advancement, and Fig. V is a sectional view of a portion of the structure illustrated in Fig. IV and taken substantially along the line V—V.

In the application of the principles of my invention an engine is equipped with a timer 10 which is of conventional design, including a governing mechanism by which the spark is advanced and retarded according to the speed of the engine. In addition to this governing mechanism the distributor is equipped with a manual spark control which co-operates in its action with the automatic governing mechanism to produce the desired spark advancement.

The manual control is actuated from a lever 11 through a series of bell-cranks and rods 12, which are so arranged as to enable the operator to actuate the spark advance automatically with the movement of the foot accelerator or independently by a movement of the hand control. Provision is also made whereby the spark may be retarded without interfering with the position of the throttle valve.

The mechanism by which these functions are realized includes a rod 13 which interconnects the manual spark control lever 11 with one arm of a bell crank 14. The other arm of the bell crank is joined through an adjustable lost motion connection 15 having an adjustable stop 15—A which is secured to rod 15—b. The rod 15—b is connected to the carburetor throttle valve 16. The lost motion connection 15 comprises a sleeve threaded upon the end of a rod connected with the bell crank lever 14 while the other end of said sleeve slidably receives the end of rod 15—b, the latter being provided with a collar or stop 15—A which may be fixedly secured in adjusted position to limit the relative movement between the sleeve and the rod 15—b. A rod 17 inter-connects the throttle valve with an accelerator pedal 18, the valve being maintained in a normally closed position by means of a spring 19 one end of which is joined to the rod and the other end to the engine 9.

The manual throttle valve control includes a rod 20 which is secured at one end through a loose link connection 21 to the throttle valve 16, the other end of the rod extends to the base of a steering column 22 where it is secured to a hand control means 23, that extends through the steering column to the wheel (not shown).

In order that the spark may be advanced or retarded manually and without interfering with the throttle valve, a second manual control is provided that includes a rod 25 connected at one end to the corresponding manual spark connection 26 at the base of the steering column and at the other end to an arm member 27 which is rigidly secured to a pivotable shaft 28. A second arm 29 is keyed to the shaft and is pivotably joined to one end of a rod 30 which is connected to the bell-crank 14 through a lost motion connection 31. The connection 31 includes a collar 32 integral with the rod and abutting the bell crank 14 on one side and a spring member 33 abutting the other side adapted to maintain the same in operative relation.

From observation it will appear that the linkage illustrated enables the operator to control the throttle valve 16 by means of the foot lever independently of the hand throttle connections since the loose link or lost motion connections 21 at the throttle valve and the ball crank 14, respectively, permit movement of the throttle valve and lost motion connection 15 without interfering with the relation of the hand control spark and the throttle rod members. If, on the other hand, the operator desires a retarded spark adjustment which is independent of the position of the throttle, the manual spark control lever is actuated through the rods 25, 30 and 13, whereby the desired position of the lever arm 11 is attained. It is further to be noted that the linkage enables the operator to control the throttle valve 16 by the hand lever through the lost motion connection 21 and stop 21'. Various other operating conditions can be realized by means of the linkages illustrated and described, as will readily occur to those skilled in the art. The construction of the steering column 22 and its manual control levers not set forth since the details thereof are well known in the art.

Referring to the governor mechanism by which the spark is varied automatically with the speed of the engine, attention is invited to Figs. IV and V wherein the operative elements are illustrated, it being understood, however, that this feature of internal combustion engine ignition is well known in the art and any other embodiment for performing this function may be employed in practicing the present invention. A central shaft is provided which is rotated at half engine speed through a gear train or a chain and sprocket mechanism (not shown). The shaft supports a small plate 41 intermediate its extremities which is integral therewith. Two symmetrical weights 42 and 43 are pivotally mounted upon the plate about pins 44 and 45 secured to plate 41 and are restrained from pivoting outwardly by reason of centrifugal force by individual coil springs 46 one end of each being secured to the weight and the other end to individual brackets 47 secured to the plate member. The extent of the outward movement of the weights is a function of the speed of the engine, the movement thereof being transmitted to a cam mounting through two vertical pins 49 and 50, which are formed integrally with the eccentric weights.

The cam mounting includes a hollow shaft 51 to which there is integrally secured a slotted cross member 52 that engages and is actuated by the pins 49 and 50. Near the upper extremity of the mounting is a cam member 53 likewise integrally secured to the hollow shaft, that actuates a breaker arm (not shown). It is to be noted that as the shaft is rotated, the pins 49 and 50 secured to the eccentrically mounted governor weights 42 and 43 are pivoted outwardly along the path of the arc indicated by the dotted lines 54. This movement in turn tends to shift the cam mounting in the direction of the arrow thereby advancing the spark. Conversely as the speed of the engine decreases the spring members will cause the weights to pivot back to their normal position carrying with them the cam mounting. The breaker arm mechanism (not shown) is mounted upon and supported by a cast iron shell 56, having an aperture in its base. The shell in turn is pivotally supported on a hollow shaft 57, the upper end of which is fitted in the base of the shell and the lower end thereof is suitably supported in the engine block (in a manner not shown). The lever arm 11 previously referred to in connection with the description of the leakage is secured integrally to the cast iron shell 56 and is adapted to actuate the same relative to the cam and hollow supporting shaft. It will be noted, that since the shell supports the breaker mechanism and said mechanism is actuated by the cam member 53 and since it is pivotable with respect thereto that movement of the same offers a means of spark advance which is independent of the governing mechanism.

Under normal operating conditions when the accelerator is depressed to open the throttle valve 16, the spark lever 11 is actuated by the linkage 12 in the direction indicated by the arrow 58, resulting in a retardation of the spark. As the speed of the engine increases, however, the governor control functions to advance the spark progressively, thereby overcoming the preliminary retarding effect. The reaction so produced can be more clearly understood by referring to Fig. III wherein the relation of the engine speed to the advance spark is plotted.

It should be noted that at any particular engine speed and load condition, there is an optimum spark range. Within certain limits there is little or no change in the performance of the engine; beyond these limits, however, the efficiency of the engine is lowered. In the diagram, three zones are plotted, one defining the optimum range of spark advancement under full load conditions, another at half load, and a third at a quarter load. The line 59 traces the path of spark advancement which is afforded by the conventional governor control, this being substantially a linear function of the speed.

The spark control which is afforded by the governor is therefore, at best, only a compromise and does not attain ideal conditions of spark advancement at the various loads. By means of the present invention ideal conditions are more nearly attained. When the operator depresses the accelerator and thereby brings the engine within the full load range, the manual lever arm is actuated to retard the spark, thereby causing it to occur within the full load range. Thus, the present invention affords a greater flexibility in spark control and assures better operating conditions than have been attainable heretofore. Moreover these conditions are realized without demanding the attention of the operator.

Although there is illustrated and described but a single embodiment of my invention it will be apparent that the herein described spark control may be employed to advantage in the other combinations without departing from the spirit of the invention and I desire therefore that it be limited only to accord with the prior art and appended claims.

I claim:

1. In an internal combustion engine having a throttle valve and a spark timer, means for operating said throttle valve and said timer, yieldable means associated with said timer operating mechanism in such a manner as to tend to move the same constantly to advanced position, and two independent stops associated with said timer operating mechanism for determining the maximum advance position to which said timer may move under the influence of said yieldable means, one of said stops being adjustably supported, and the other being connected with said throttle valve operating mechanism to move therewith.

2. In combination with an internal combustion engine having a spark timer and a throttle valve, foot operated and hand operated means for actuating said throttle valve, a governor for varying the spark timing in accordance with the speed of said engine, means operated by said throttle valve for positively retarding the spark timing as said throttle valve moves to open position, the movement of said means being a pre-determined function of the movement of said throttle valve, and manually controlled means for positively retarding the spark at any time and fixing the point of maximum advance for the spark.

3. In an internal combustion engine having a throttle valve and a spark timer, a governor for adjusting said timer in accordance with the speed of said engine, other means for adjusting said timer, said means being normally spring pressed toward advanced position, and two independent movable stops, each stop being capable of positively moving said means from advanced to retarded position and determining the maximum advance position in which said means may move under the influence of said spring, one of said stops being manually adjustable, and the other of said stops being connected with said throttle valve for movement therewith.

4. In an internal combustion engine having a throttle valve and a spark timer, means for varying the setting of said timer in accordance with variations in the speed of said engine, an arm connected with said timer for movement to vary the setting thereof independently of said means, a rod connected with said throttle valve and having a loose link connection with said arm in such a manner as to be operative to positively move said arm to retarded position and determine the maximum permissible advance of said arm in accordance with the movement of said throttle valve, and means operative independent of said loose link connection to positively retard said spark.

5. In an internal combustion engine having a throttle; foot operated and hand operated means for selectively operating said throttle; a spark control system for the engine comprising a housing; a timer and an automatic governor spark control mechanism positioned in said housing; means operating independently of said automatic control and actuated by said first mentioned means for retarding the spark progressively with the opening movement of the throttle; and manually operated means including a lost motion connection for controlling the spark setting independently of the operation of said throttle and the operating means therefor.

6. In an internal combustion engine having a throttle; foot operated and hand operated means for selectively operating said throttle; a spark control system for the engine comprising a housing; a timer and an automatic governor spark control mechanism positioned in said housing; means operating independently of said automatic control and actuated by said first mentioned means for momentarily retarding the spark with the opening movement of the throttle; and manually operated means operative independent of said throttle actuating means for controlling the spark setting.

In testimony whereof, I affix my signature.

REX C. DARNELL.